United States Patent [19]

Cavalli

[11] Patent Number: 4,573,329
[45] Date of Patent: Mar. 4, 1986

[54] MACHINE FOR MAKING ICE-CREAM AND SIMILAR COLD PRODUCTS, WITH A REMOVABLE FREEZING CONTAINER

[76] Inventor: Alfredo Cavalli, Via Galileo Galilei, 9, Pessano Con Bornago (Milan), Italy

[21] Appl. No.: 674,754

[22] Filed: Nov. 26, 1984

[30] Foreign Application Priority Data

Nov. 30, 1983 [IT] Italy ................. 23950 A/83

[51] Int. Cl.⁴ ............................................. A23G 9/00
[52] U.S. Cl. ........................................ 62/342; 62/518; 165/169
[58] Field of Search ............... 62/342, 343, 518; 165/136, 169; 219/311, 535

[56] References Cited

U.S. PATENT DOCUMENTS

| | | | |
|---|---|---|---|
| 2,788,643 | 4/1957 | Martin | 62/343 X |
| 2,801,321 | 7/1957 | Prindle | 219/311 X |
| 3,335,789 | 8/1967 | Raskin | 165/169 X |
| 3,358,118 | 12/1967 | Mather et al. | 219/311 X |
| 3,452,555 | 7/1969 | Thurman et al. | 62/342 X |
| 3,553,976 | 1/1971 | Cumine et al. | 165/169 X |
| 3,952,538 | 4/1976 | Warlick | 62/342 |
| 4,206,805 | 6/1980 | Beckett | 165/169 X |
| 4,213,498 | 7/1980 | Vandenbossche | 165/169 X |
| 4,392,631 | 7/1983 | Cavalli | 62/343 |
| 4,429,549 | 2/1984 | Randolph | 62/342 |

Primary Examiner—William E. Tapolcai
Attorney, Agent, or Firm—Cohen, Pontani & Lieberman

[57] ABSTRACT

A machine for making ice-cream and similar cold products is described, which has a freezing container insertable in and removable from a substantially cylindrical cooling chamber. The chamber is elastically-deformable and has a circular cross-section that is not completely closed on itself due to the presence of a passage. The passage is closed by a pair of shields and by a substantially bellows portion of elastically yielding and thermally insulating material. In this manner, a better thermal efficiency of the machine is obtained.

4 Claims, 7 Drawing Figures

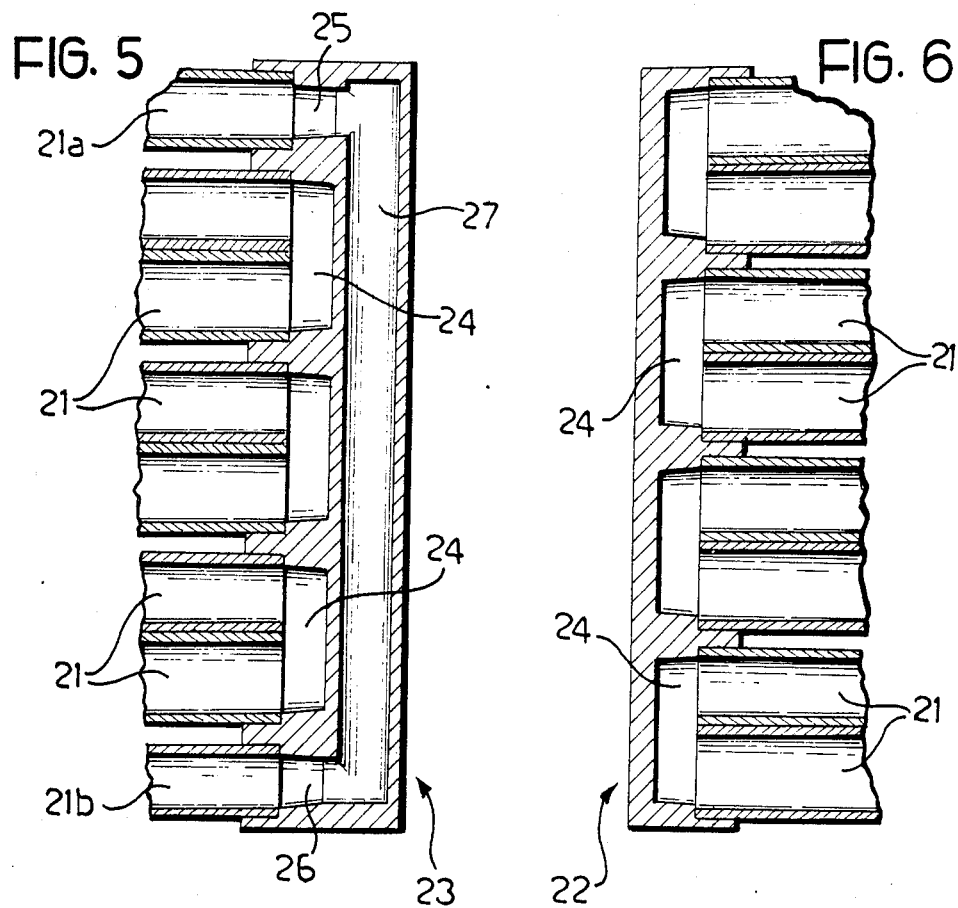
FIG. 5
FIG. 6
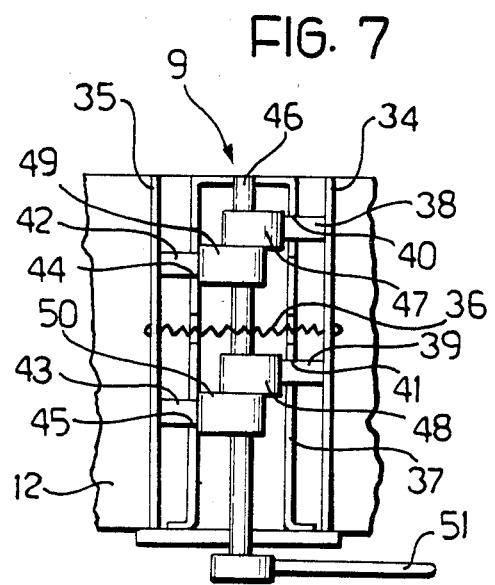
FIG. 7

MACHINE FOR MAKING ICE-CREAM AND SIMILAR COLD PRODUCTS, WITH A REMOVABLE FREEZING CONTAINER

BACKGROUND OF THE INVENTION

The present invention relates to machines for making ice-cream and similar cold products. In particular, it concerns a machine of the type having a freezing container which is insertable in and removable from a cooling chamber comprising a substantially cylindrical cooling coil of the type constituted by a plurality of lengths of tubing connected together in series by means of two manifold bodies which are spaced apart in a circumferential direction and define a passage. A substantially cylindrical elastic sheath which has a discontinuity along a generatrix in correspondence with the passage surrounds the coil, and a layer of elastically yielding thermally insulating material is interposed between the coil and the sheath.

As is known, in a machine for making ice-cream, the ability to remove the freezing container enables several important advantages to be obtained. In particular, it facilitates the rapid recovery of the ice-cream product by simply overturning the removed container, makes cleaning operations easier and more efficient, and permits successive production cycles with greatly reduced down times.

However, it is also known that the removability of the freezing container creates problems which are difficult to solve, primarily the thermal efficiency.

Machines have been proposed, for example, in which the freezing container is immersed in a brine of water, ice and salt, which in turn is contained in a container cooled by a coil. However, this technique is known to involve serious complications in construction, as well as great inconvenience in use.

Another type of machine proposed is that in which the freezing container is conical and can be inserted into a corresponding conical basket formed by the coil. The thermal efficiency is so low, however, due to the uncertain contact between the coil and the freezing container, that any practical embodiment has proved unsatisfactory.

A third type of machine is described in the co-pending U.S. Application Ser. No. 574,593 filed on Jan. 27, 1984 by the same Applicant and now U.S. Pat. No. 4,538,427. In a machine of this type, the freezing container is insertable in and removable from a cylindrical cooling chamber comprising two half-shells which can be opened to receive the container and can be closed around it. The cooling coil which forms the chamber is elastically yielding in a radial direction relative to the chamber. This solution is undoubtedly a considerable advance over the prior art, enabling better contact between the cooling coil and the freezing container with greater efficiency of the machine.

The efficiency is further improved in a machine of the type described in the co-pending U.S. Application Ser. No. 610,766, filed on May 16, 1984 by the same Applicant and now U.S. Pat. No. 4,535,604. In this machine, the cylindrical cooling chamber has a circular cross-section which is not completely closed on itself due to the presence of a slit extending along a generatrix. The side of the chamber comprises an elastic outer sheath, and means are provided for enlarging the chamber by opening the slit against resilient means constituted by the sheath. In this machine the contact between the cooling coil and the freezing container is further improved, and, with it, the efficiency is improved.

Like these ice-cream-making machines, the present invention tackles the problem of further improving the already good thermal efficiency.

SUMMARY OF THE INVENTION

In accordance with the present invention, this problem is solved by an ice-cream making machine of the aforesaid type, characterised in that it includes two plate-like shields each secured to a respective manifold body and extending towards one another in the passage, and in that the layer of elastically yielding and thermally insulating material includes a substantially bellows portion extending in the passage between the shields and the sheath in order to allow the widening of the passage.

BRIEF DESCRIPTION OF THE DRAWINGS

Further characteristics and advantages of a machine according to the invention will become apparent from the description of one preferred embodiment, which follows with reference to the accompanying drawings. In these drawings:

FIG. 5 is a section along the line V—V of FIG. 3;

FIG. 6 is a section along the line VI—VI of FIG. 3;

FIG. 7 is a side view of a detail of the machine of FIG. 1, taken on the arrow VII on a reduced scale.

DETAILED DESCRIPTION OF THE DRAWINGS

Figure 1:
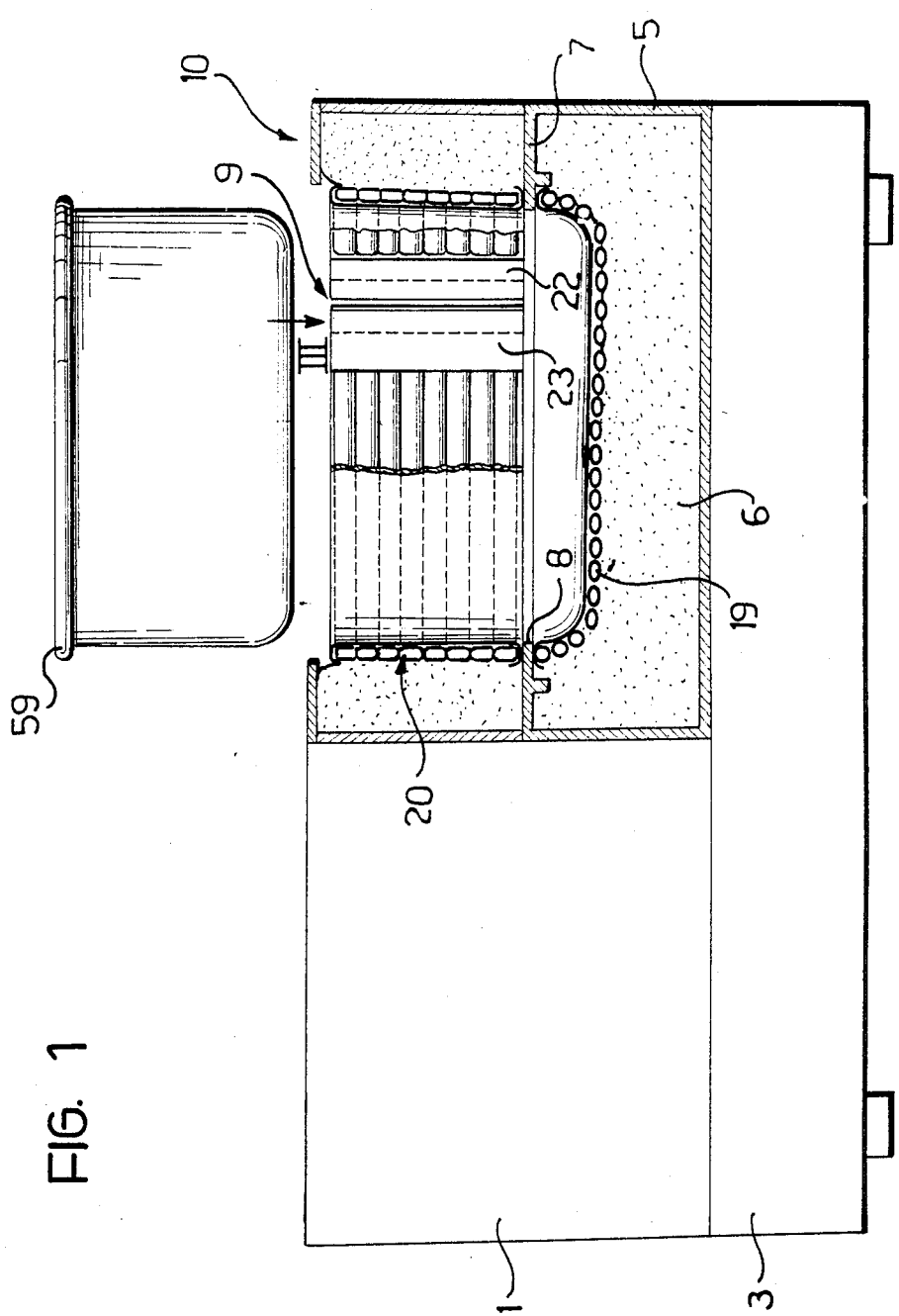
FIG. 1 is a diagrammatic vertical sectional view of a machine according to the invention.

The drawings illustrate a machine for making ice-cream, which comprise a box-like body 1 for accommodating a conventional refrigerating unit, not shown, and any drive members for rotating a freezer blade, which are also conventional and thus not shown. Moreover, the box-like body 1 includes a plinth 3, which is also box-like, in which the main parts of the machine are supported and housed.

A box-like parallelepipedal base 5, having a circular aperture 8 in its upper wall 7, is fixed onto the plinth 3.

The base 5 contains a block 6 of elastically yielding and thermally insulating material, for example, rubber.

The box-like base 5 supports a cylindrical cooling chamber 10 which has a circular cross-section that is not completely closed on itself due to the presence of a passage 9 extending along a generatrix, as will become apparent later in the description, and is positioned concentrically above the aperture 8.

Figure 2:
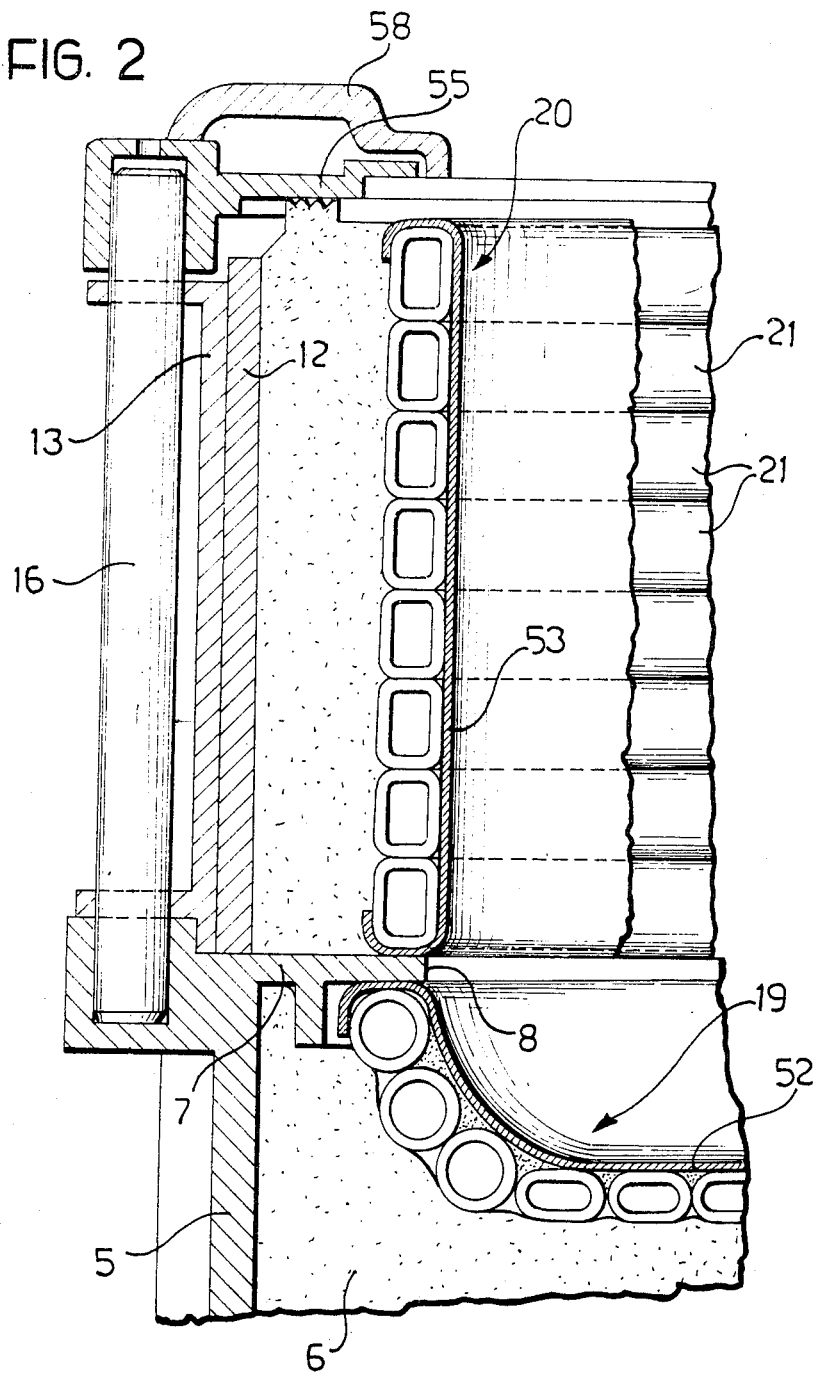
FIG. 2 is a sectional view of a detail of the machine of FIG. 1 on an enlarged scale.

With reference to FIG. 2, the chamber 10 comprises an elastically-deformable outer sheath 12 which has a discontinuity along a generatrix in corresponding with the passage 9 (FIG. 1) and is secured to the box-like base 5 by a substantially hinged coupling comprising a support 13 and a vertical pin 16.

The chamber 10 is therefore restrained on the box-like base 5 by the pin 16.

The chamber 10 also includes ducts for the circulation of refrigerant fluid. In particular, it includes a first coil 19 in correspondence ith its base and secured onto the block 6, and a second cylindrical coil 20 in correspondence with its inner side wall. The coil 20 comprises a plurality of lengths of tubing 21 arranged above one another in substantial contact. In abutment with the plurality of lengths of tubing 21, in correspondence with their opposite ends, are two manifold bodies 22, 23 of 23 (FIGS. 1 and 3-6) form, which are side by side and define the passage 9 referred to above. A plurality of transversely extending cavities 24 (FIGS. 4-6) are formed in each of the bodies 22, 23 and open onto one of their walls. Each of the cavities 24 receives the two adjacent ends of one pair of the lengths of tubular 21, for which the cavity in question constitutes a union. Preferably, the lengths of tubing 21 are secured in the respective cavities 24 with the interpostion of a conventional low-temperature sealant.

Preferably, two cavities 25, 26 (FIG. 5) are formed at the two opposite ends of the body 23. The cavities 25, 26 each receive only one respective end of the first and last of the lengths 21, indicated 21a and 21b respectively, and communicate with each other by means of a longitudinal hole 27 in the body 23. In this manner, the planarity of the lengths 21 is obtained, with obvious advantages in the assembly stage. The two bodies 22 and 23 are rigidly connected to the sheath 12 (FIG. 3) by conventional means, for example screws 28, close to the passage 9.

A layer 29 (FIGS. 2,3) of elastically yielding and thermally insulating material, for example rubber, is interposed between the sheath 12 and the coil 20. The layer 29 is secured to the sheath 12 and the coil 20 by means of the screws 28 for securing the manifold bodies 22 and 23. In correspondence with the passage 9, the layer 29 is not discontinued but has a portion 30 of substantially bellows section to allow the enlargement of the passage 9; in the example illustrated in FIG. 3, this bellows comprises a single fold.

Figure 3:
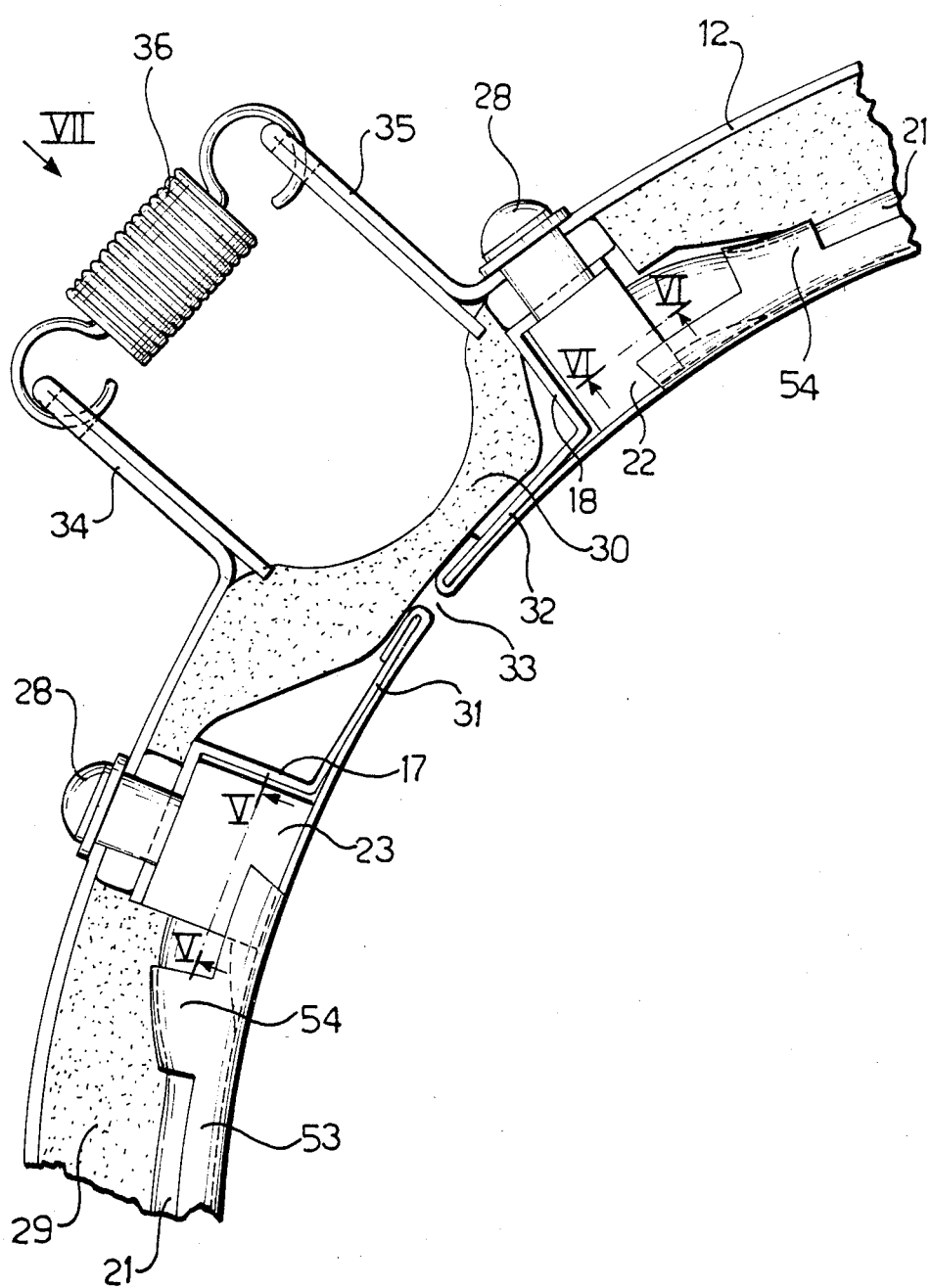
FIG. 3 is a plan view of a detail of the machine of FIG. 1 taken on the arrow III, in which, for clarity of the drawing, the detail shown in FIG. 7 has been omitted.
Figure 4:
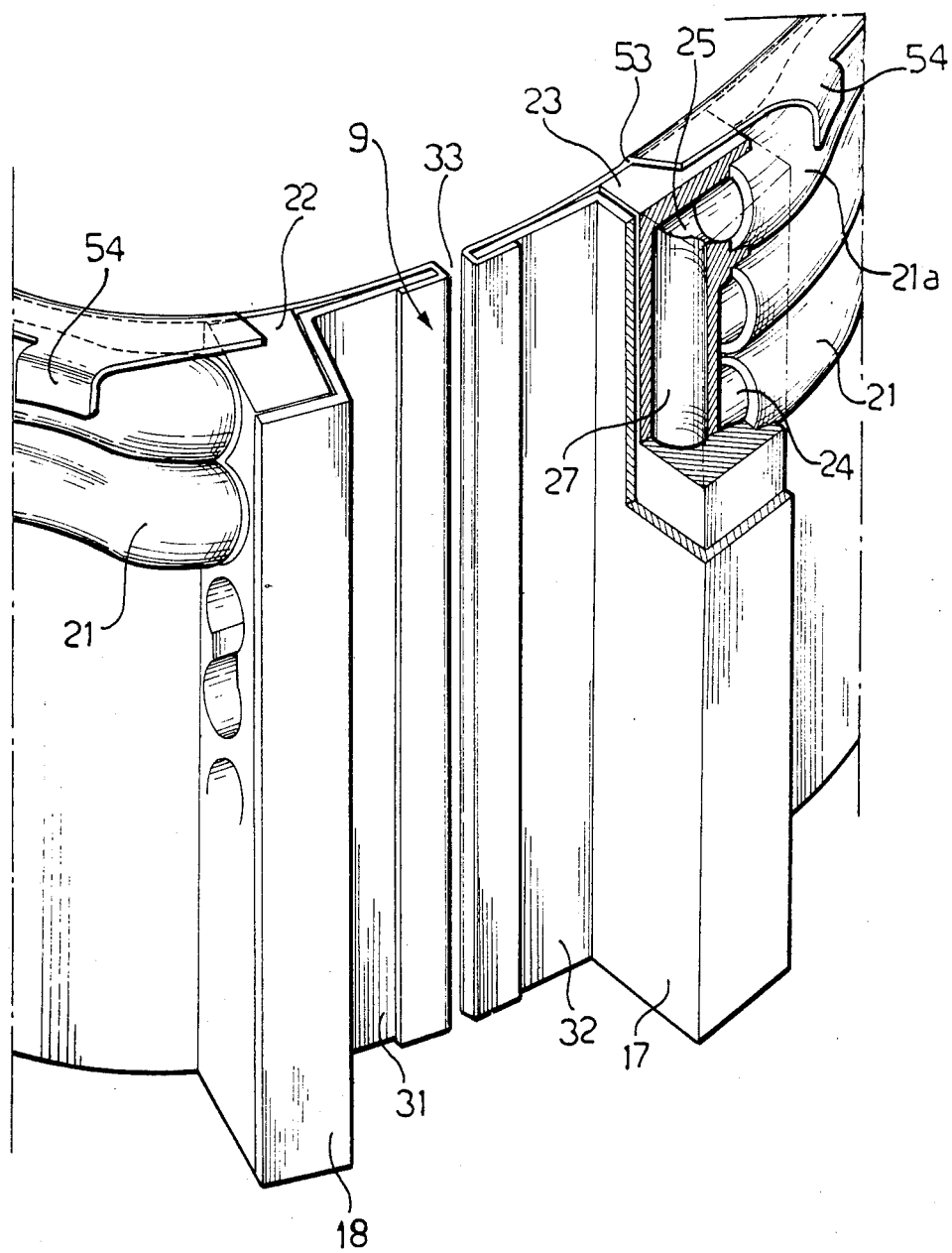
FIG. 4 is a partially-sectioned perspective view of part of the machine of FIG. 1, in which, for clarity of the drawing, details shown in other Figures have been omitted.

Referring to FIGS. 3 and 4, plate-like shields 17 and 18 are also secured to the bodies 22,23 again with the screws 28. Shields 17, 18 extend into the passage 9 and have respective sides 31, 32 turned towards one another and defining a slit 33.

In correspondence with the passage 9, the sheath 12 has flanges 34 and 35 (FIG. 3) which are bent radially outwardly and form supports in the tangential direction. The flanges 34 and 35 are urged resiliently towards one another by resilient means constituted by the sheath 12, which tends to close, and, if necessary, by an auxiliary spring 36 stretched between the flanges 34 and 35.

Referring to FIGS. 1, 2 and 7 frame 37 is secured rigidly on the box-like base 5 opposite the pin 16 and is inserted between the flanges 34 and 35 of the sheath 12 in correspondence with the passage 9.

The frame 37 supports a plurality of small pistons housed in respective seats and guided therein for movement towards and away from the flanges 34 and 35; according to the preferred embodiment illustrated in FIG. 7, for example, the frame 37 includes two pistons 38, 39 housed in respective seats 40, 41 and movable towards and away from the flange 34, and two pistons 42, 43 housed in respective seats 44, 45 and movable towards and away from the flange 35.

The frame 37 also supports a vertical pin 46 to which respective operating cams are keyed in correspondence with each small piston; according to the preferred embodiment illustrated in FIG. 7, the pin 46 supports four cams 47, 48, 49 and 50 positioned in correspondence with the pistons 38, 39, 42 and 43, respectively.

The pin 46 is movable angularly in the frame 37 under the action of control members, for example a manually-operable lever 51 integral with the pin 46.

The members indicated 37 to 51 constitute means for enlarging the chamber 10 by opening the slit 33 against the elastic reaction of the sheath 12 and/or the spring 36; thus, they enable the chamber 10 to be enalarged or not.

Referring to FIG. 2 the coil 19 is covered on its upper surface by a plate 52, preferably of copper and of very small thickness.

Referring to FIGS. 2-4 coil 20 is lined with a skin 53, preferably copper, of very small thickness. The skin 53 has a plurality of tabs 54 and is secured by the bending of these tabs 54 over the shields 17, 18 and the coil 20.

Between the coils 19, 20 and the plate 52 and the skin 53 respectively, there is interposed a quantity of conventional thermoconductive sealant paste sufficient to fill completely all the interstices.

The coil 20, the sheath 12 and the layer 29 are closed in a single compact structure by two annular flanges (FIG. 5): a first flange 55 resting on the layer 29; a second closure flange 58 above the flange 55.

Finally, a substantially cylindrical freezing container 59 used in the machine of the invention is indicated in FIG. 1. This container 59 has an external diameter lying between the internal diameter of the chamber 10 when it is not enlarged and the internal diameter of the chamber 10 when it is enlarged. As a result, when the chamber 10 is not enlarged, the coil 20 presses against the container 59 and clamps it, whereas, when chamber 10 is enlarged, there is a consistent space between the coil 20 and the container 59 which permits the removal (or insertion) of the container 59.

Advantageously, according to a preferred embodiment of the invention, the lengths 21 of the coil 20 have a substantially quadrangular section, obtained by subjecting the entire coil 20 to a flattening operation.

The functioning of the machine of the invention described above is as follows:

Initially, the cooling chamber 10 is in an enlarged condition, this condition having been obtained by moving the lever 51 angularly about the vertical pin 46 so that the cams 47, 48, 49, 50 push the respective small pistons 38, 39, 42, 43 and open the slit 33, thereby enlarging the chamber 10.

A freezing container 59 is then easily inserted in the cooling chamber 10 and, when fully inserted, rests on the plate 52 while its lateral surface is substantially not in contact with the skin 53.

When the insertion has been completed, the lever 51 is operated again to enable the closure of the slit 33. Since the internal wall of the cooling chamber 10 has a diameter less than the external diameter of the container 59, the coil 20 really encompasses the freezing container in the non-enlarged condition. Furthermore, considering the presence of the layer 29 of elastically yielding material on which the coil 20 is mounted, the elastic reaction of the sheath 12 and/or the spring 36 is distributed uniformly over the various lengths 21 constituting the coil, thus ensuring an effective contact between each length 21 and the external wall of the freezing container 59 through the skin 53.

It should be noted how the bellows portion 30 of the layer 29 permits easy opening and closing of the slit 33 due to its high degree of deformability, as well as always ensuring an effective thermal insulation to which the shields 17 and 18 also contribute.

The lengths 21 of the coil 20 have a substantially quadrangular section so as to allow the maximum heat exchange with the minimum bulk. Moreover, the internal surface of the coil 20 is made more even and therefore more suited to coupling with the freezing container 59.

The contact is further improved by the presence of the skin 53. Furthermore, this skin 53 proves extremely useful in the cleaning of the cooling chamber 10 which, precisely due to the skin 53, has an even and continuous internal surface.

I claim:

1. A machine for making ice-cream and similar cold products, comprising:
    a cooling chamber formed by a substantially cylindrical cooling coil, said coil being formed by a plurality of lengths of tubing connected together in series by means of two manifold bodies which are spaced apart in a circumferential direction and define an axially extending passage therebetween, a substantially cylindrical elastic sheath, with an axially extending discontinuity facing said axially extending passage, externally surrounding said cooling coil,
    a freezing container insertable in and removable from said cooling chamber,
    two plate-like shields each secured to a respective manifold body and circumferentially projecting towards one another in said axially extending passage,
    a layer of elastically yielding and thermally insulating material interposed between said cooling coil and said elastic sheath, said layer including a bellows portion extending inside said passage between said plate-like shields and said sheath.

2. A machine according to claim 1 wherein said manifold bodies are rigidly connected to said sheath and to said layer of elastically yielding and thermally insulating material.

3. A machine according to claim 1 wherein said lengths of tubing of the cooling coil are substantially quadrangular in cross section.

4. A machine according to claim 1, wherein said cooling coil and said shields are lined with a metal skin.

* * * * *